B. F. KELLEY.
SOCKET.
APPLICATION FILED DEC. 27, 1920.
1,406,029.
Patented Feb. 7, 1922.
2 SHEETS—SHEET 1.
Fig. 1.
Fig. 4.
Fig. 5.
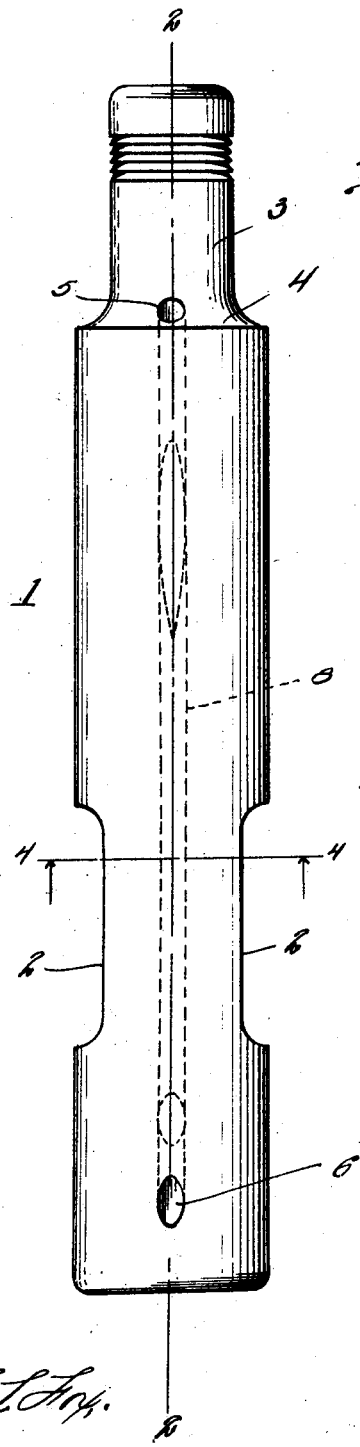
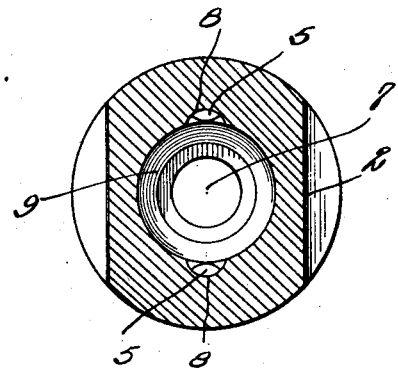
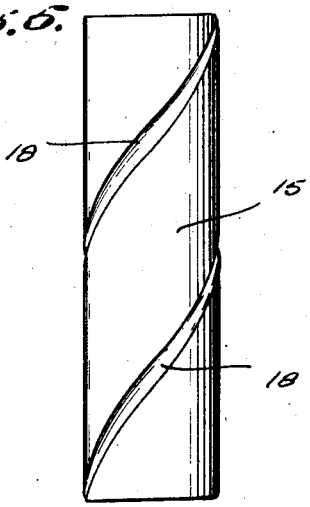
B. F. Kelley,
INVENTOR
BY Victor J. Evans.
ATTORNEY
WITNESSES:

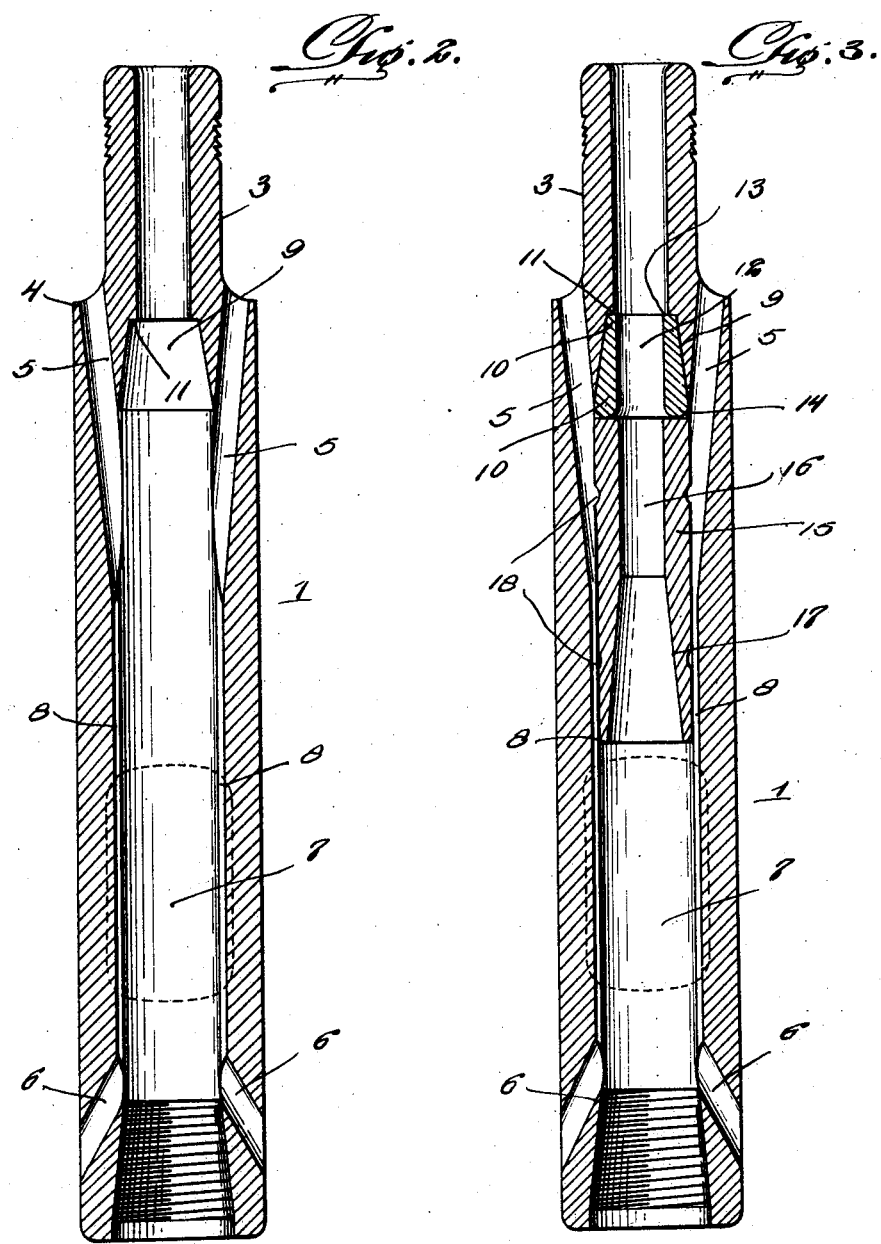

UNITED STATES PATENT OFFICE.

BENJAMIN F. KELLEY, OF TULSA, OKLAHOMA, ASSIGNOR OF ONE-FOURTH TO R. A. GRIFFITH AND ONE-FOURTH TO THOMAS J. McKINNEY, BOTH OF TULSA, OKLAHOMA, AND ONE-FOURTH TO WILLIAM K. HUGHES, OF ST. LOUIS, MISSOURI.

SOCKET.

1,406,029. Specification of Letters Patent. Patented Feb. 7, 1922.

Application filed December 27, 1920. Serial No. 433,467.

*To all whom it may concern:*

Be it known that I, BENJAMIN FRANKLIN KELLEY, a citizen of the United States, residing at Tulsa, in the county of Tulsa and State of Oklahoma, have invented new and useful Improvements in Sockets, of which the following is a specification.

My present invention has reference to a wire line swivel socket which is used as a coupling or connection between the drill cable and the drill tool in drilling oil or water wells, and the primary object of the invention is to produce a device of this character in which the swivel is washed and lubricated by fluid passing through the socket in a better manner than has heretofore been accomplished, as well as the production of means between the movable swivel and socket for reducing the friction caused by the contact therebetween.

A further object is to construct a device of this character in which the wash-out holes at the top and bottom of the socket are arranged almost in a straight plane with respect to the longitudinal axis of the socket so that fluid can more readily enter and find an exit through said openings than by arranging the openings transversely in the bore of the socket, as is the common practice.

A further object is to provide the bore of the socket with longitudinal channels which communicate with the respective upper and lower wash-out openings, and to also provide the outer surface of the cable swivel with a spiral groove which extends from one to the other end thereof, so that parts of the said groove are always opposite the channels, and whereby the fluid received in the wash-out openings and passing through the channels will be delivered into the groove of the swivel, thereby eliminating any possible chance of sand or mud clogging up in the socket body or obstructing the free movement of the swivel therein.

It is a further object of the invention to produce a wire line swivel socket in which the bore of the socket inward of the stem thereof has a frusto-conical pocket that provides a seat for a swivel bearing which is tapered complemental with the side walls of the socket and which has its lower and widened end rounded in cross section so as to offer a comparatively small contact surface for the swivel, the bore of the swivel bearing being less than the bore of the stem, so that an instrument may be inserted in the stem to contact with the upper reduced end of the bearing and to force the same out of its pocket, when the said bearing becomes worn and is to be replaced by a new bearing.

The foregoing, and other objects which will appear as the nature of the invention is better understood, may be accomplished by a construction, combination and operative arrangement of parts, such as is illustrated by the drawings which accompany and which form part of this application.

In the drawings :—

Figure 1 is a side elevation of the improvement.

Figure 2 is an approximately central vertical longitudinal sectional view therethrough, on the line 2—2 of Figure 1.

Figure 3 is a similar sectional view but showing the swivel and the swivel bearing arranged in the socket.

Figure 4 is a sectional view on the line 4—4 of Figure 1.

Figure 5 is a side elevation of the swivel.

The socket is broadly indicated by the numeral 1, and exteriorly is of a similar construction to the ordinary form of such devices. The socket has its sides reduced, adjacent to the lower ends thereof to provide flat wrench surfaces 2, and has its upper end provided with a reduced extension that forms the neck 3 thereof.

At diametrically opposite points from the shoulder 4 provided between the socket proper and the stem 3 thereof, there are formed inwardly extending elongated wash-out openings 5 respectively. These openings are as nearly straight as possible, but, of course, communicate with the bore of the socket. The socket, adjacent to its lower end, which receives the tool, is provided with upwardly directed angularly disposed wash-out openings 6 respectively arranged directly opposite the respective upper wash-out openings. The lower wash-out openings are arranged at a more determined angle than the upper wash-out openings, and the bore 7 of the socket, between the respective pairs of upper and lower wash-out openings is channeled longitudinally, as at 8 respectively. By this arrangement, it will be apparent that the fluid entering either the lower or upper wash-out openings will be directed through the channels 8. The wash-out openings 5, being arranged, as stated, between the shoulder and the bore of the socket, and being arranged at only a very slight inclination, will more readily receive the fluid than one of the openings arranged transversely with respect to the bore, and consequently a greater amount of fluid will enter these openings.

Slightly below the juncture of the body 1 of the socket with the stem 3 thereof, there is an approximately frusto-conical pocket 9, the reduced end of which being next to the bore of the stem 3, and the widened lower end of which being of the same circumference as the bore 7 of the socket. This pocket 9 provides a seat for the swivel bearing 10. The bearing 10 has its outer wall flared complemental with the flared wall of the pocket 9, so that the swivel is snugly received in the said pocket, and the reduced upper end 10 of the said swivel contacts with the shoulder 11 provided at the upper wall of the pocket 9. The bore 12 of the swivel bearing 10 is of a less diameter than that of the bore of the stem 3, and consequently the inner wall provided by the bore of the socket is extended inwardly of the bore of the stem. For distinction, the portion of the swivel bearing that projects into the bore is indicated by the numeral 13, and it will be noted that the same is of a sufficient size to receive thereagainst a suitable tool which may be inserted through the bore of the stem, and forcibly contacted to remove the swivel bearing from its seat. The lower or outer end of the swivel bearing is round in cross section, as indicated by the numeral 14.

The swivel is in the nature of a tubular member, and is indicated by the numeral 15. The bore 16 of the swivel has its lower portion flared outwardly, as at 17 to receive the end of the cable (not shown). The end of the cable is spread and brought into forcible contact with the walls of the flared portion 17 of the bore of the swivel in the usual manner, and held in such contact by the insertion of Babbitt metal or the like between the spread strands. The cable operates the swivel and the swivel operates the socket in the usual manner.

The swivel has on its outer surface a continuous groove 18 that has portions thereof at all times arranged to communicate with the channels 8 as well as with the inlets of the upper wash-out openings 5 when the swivel is brought into contacting engagement with the swivel bearing, as illustrated in Figure 3 of the drawings.

It is thought that the foregoing description, when taken in connection with the drawings will fully set forth the simplicity of the construction and the advantages of the improvement to those skilled in the art to which such inventions relate without further detail description. It is thought necessary to state, however, that the description and showing refer to a practical embodiment of the improvement as it now appears to me, but that I am entitled to make all such changes therefrom as fall within the scope of what is claimed.

Having described the invention, I claim:—

1. A rope socket body having an axial bore therethrough, said body having vertically arranged angularly disposed wash-out openings between the neck and bore thereof, said body having lower upwardly directed angularly disposed wash-out openings, and the bore of the body having channels communicating with the openings.

2. A rope socket body having a neck at the upper end thereof provided with an axial bore of a less circumference than the bore of the body, said body having vertically directed angularly disposed upper wash-out openings between the stem and bore of the body, said body having upwardly directed angularly disposed lower wash-out openings, the bore of the body having longitudinal channels communicating with the respective pairs of wash-out openings, a swivel in the body, and a removable swivel bearing in the body between the bore of the body and the bore of the stem.

3. A rope socket body having a stem at the upper end thereof provided with an axial bore of a less circumference than the bore of the body, said body having vertically directed angularly disposed upper wash-out openings between the stem and bore of the body, said body having upwardly directed angularly disposed lower wash-out openings, the bore of the body having longitudinal channels communicating with the respective pairs of wash-out openings, a swivel in the body, and a removable swivel bearing in the body between the bore of the body and the bore of the stem, and said swivel bearing having its lower end rounded in cross section.

4. In a device for the purpose set forth, a rope socket body having a reduced stem at the upper end thereof and the bore of the stem being of a less circumference than the bore of the body, said body having a flared pocket between its bore and the bore of the stem, said body having upper and lower wash-out openings, the former being vertically disposed between the shoulder at the juncture of the stem with the body and the bore of the body, and the latter being upwardly directed to the bore, the body having its bore provided with longitudinal channels communicating between the respective upper and lower wash-out openings, a swivel bearing having an upper flared surface complementary with the flared wall of the pocket, and received in said pocket, the bore of the socket bearing being of a less circumference than that of the bore of the stem, a rope swivel in the bore of the body, and in the path of contact with the swivel bearing, the said rope swivel having its outer surface provided with a spiral groove which extends from one to the other end thereof, all as and for the purpose set forth.

In testimony whereof I affix my signature.

BENJAMIN F. KELLEY.